United States Patent [19]

Costenoble et al.

[11] Patent Number: 4,726,779

[45] Date of Patent: Feb. 23, 1988

[54] GALVANIC PRIMARY CELL

[75] Inventors: Ullrich Costenoble, Rainau; Rolf Hennrich, Ellwangen, both of Fed. Rep. of Germany

[73] Assignee: Varta Batterie A.G., Hanover, Fed. Rep. of Germany

[21] Appl. No.: 895,877

[22] Filed: Aug. 12, 1986

[30] Foreign Application Priority Data

Aug. 20, 1985 [DE] Fed. Rep. of Germany ....... 3529723

[51] Int. Cl.$^4$ ..................... H01M 2/18; H01M 4/00
[52] U.S. Cl. ..................... 429/133; 429/66; 429/130
[58] Field of Search ............... 429/130, 133, 165, 66

[56] References Cited

U.S. PATENT DOCUMENTS

| 3,272,655 | 9/1966 | Balaguer | 429/66 X |
| 3,510,358 | 5/1970 | Nabiullin et al. | 429/133 |
| 4,032,695 | 6/1977 | Coibion | 429/133 X |
| 4,154,905 | 5/1979 | Urry | 429/165 X |

Primary Examiner—Brian E. Hearn
Assistant Examiner—Stephen J. Kalafut
Attorney, Agent, or Firm—Weiser & Stapler

[57] ABSTRACT

In a galvanic primary cell, the anode mixture of a zinc-alkaline electrolyte gel is displaced by the introduction of a hollow body into the concentrically arranged anode space so that the zinc powder is fixed in a layer oriented toward the cathode of the cell, ensuring proper discharge, and so that the aqueous portion of the anode mixture can escape inside the displacement body through narrow openings in the body's wall. By attaching the displacement body to the negative electrode conductor, the current drainage can be improved by making at least part of the displacement body of a metallically conducting material.

17 Claims, 3 Drawing Figures

FIG. 1
FIG. 2
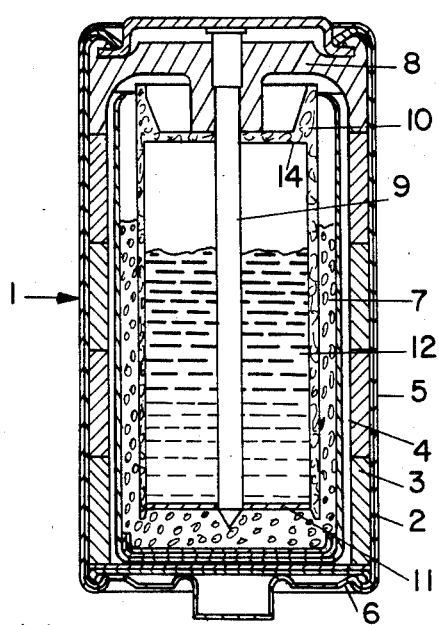
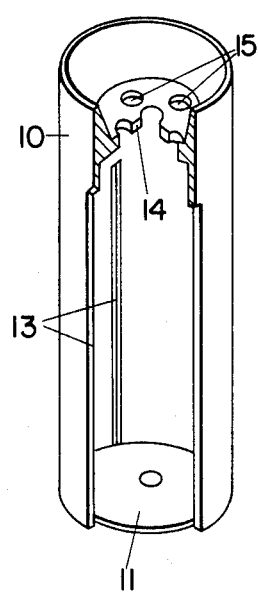
FIG. 3
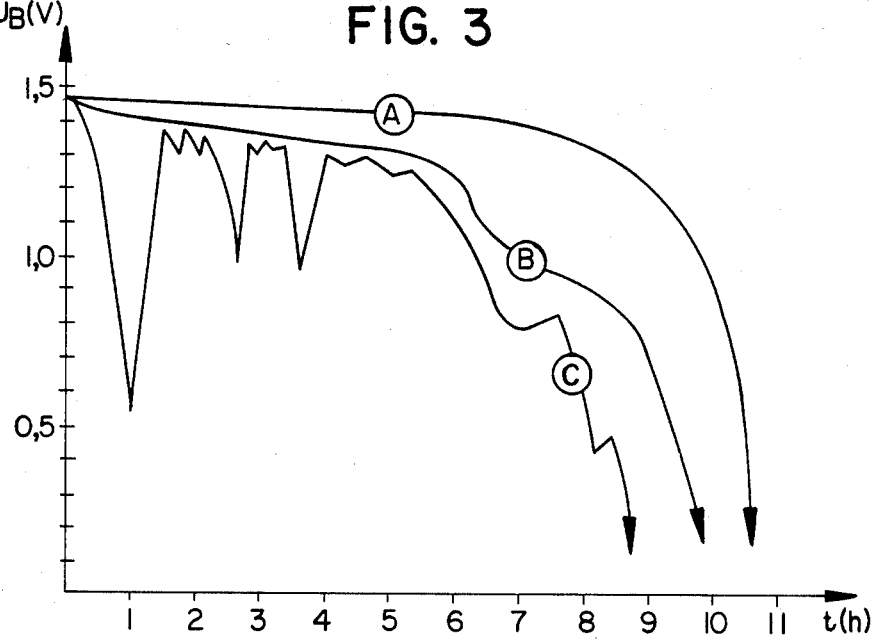

GALVANIC PRIMARY CELL

BACKGROUND OF THE INVENTION

The present invention relates generally to a galvanic primary cell of the type having a thickened alkaline electrolyte, and in particular to a galvanic primary cell of this type which contains an inner negative electrode comprised of a pasty zinc powder, an outer positive manganese dioxide or silver oxide electrode in the form of a ring-shaped cylinder, and an interposed separator, in a concentric arrangement within a cup-shaped metal housing.

During the assembly of such a round alkaline cell, pressed, ring-shaped parts comprised of a manganese dioxide/graphite mixture or silver oxide are first introduced as a stack into a cylindrical plate housing, and pressed to form a tubular cathode. The separator is then tightly fit into this tube in thin nonwoven layers or films, in the form of a sleeve or overlapping layers. The remaining inner space is then filled, either partially or completely, with a mixture of zinc powder, a thickener and an electrolyte (preferably potassium hydroxide), to form the cell's anode. The conductor for the anode is preferably a brass or copper nail which is concentrically received within the zinc powder mixture, and to which is soldered the cell's cap. The cap is isolated from the plate housing by a ring-shaped plastic element, which also serves as a seal.

Generally, the zinc powder and the aqueous alkali solution are separately introduced into the cell, with the result that the aqueous alkali solution tends to collect either above or below the zinc powder. In such cases, it has been found that the flat and uniform distribution of the resulting paste in all directions on the inside of the separator is not assured. Even if the zinc powder is initially stirred with the alkali solution and thickener to form the paste, intimate mixing with the aqueous alkali solution within the cell will still not take place. In either case, the zinc powder remains mobile, and the electrical state and discharge parameters may therefore change considerably during any subsequent shaking of the cell.

This lack of homogeneity of the zinc paste is especially troublesome in connection with cells which are intended to operate at high working temperatures, such as the primary cell described in DE-OS No. 33 37 570. Because of the risks of bursting such cells as a consequence of significantly increasing internal pressures, it has proven advisable to fill the anode space to only about ⅔ of its actual capacity to provide a collection space for the gases being generated (e.g., a few cm$^3$, depending on the cell size). This assumes a rate of H$_2$ generation for a "baby"- type cell of about 1 cm$^3$/hour at 163° C.

Contrary to conventional alkaline round cells, wherein the anode space is practically completely filled, the above-described reduced filling which is indicated for alkaline cells having a thickened electrolyte is relatively unpredictable, resulting in the sharp inflections of the discharge curve which can sometimes occur during discharges at high temperatures. Moreover, the circular filling of the anode space tends to stratify horizontally, such that the zinc (being the heaviest component) essentially occupies the lower third of the anode space. The middle third is occupied by the aqueous electrolyte, while the top third is a hollow space.

DE-PS No. 1,201,436 attempts to remedy this situation by attempting restratification of the zinc as a homogeneous distribution opposite the cathode surface by centrifugation. With existing cell designs, this did not lead to the desired result because the brass nail which serves as the negative conductor tended to lose contact with the zinc. Moreover, the zinc layer was unstable and tended to collapse during shaking.

SUMMARY OF THE INVENTION

It is therefore the principal object of the present invention to provide a primary cell of the type previously described wherein the potential for loss of contact due to decomposition or segregation of the zinc electrolyte gel is effectively eliminated.

This and other objects are accomplished according to the present invention by taking steps to press the zinc powder floating in the thickened electrolyte, radially against the cathode surface using a displacement body which is concentrically immersed as a hollow body into the anode space. The displacement body according to the present invention may have a variety of different shapes including spherical, pear-shaped or oval shapes, or even prismatic, triangular, or rectangular cross-sections, so long as the selected shape performs a displacement function. A cylindrical displacement body having a flat or preformed bottom is especially advantageous in connection with round cells. In any event, the contours of the displacement body should be dimensioned so that the zinc paste which is displaced around the displacement body forms a layer which is optimized for discharge.

For further detail regarding a preferred embodiment galvanic primary cell according to the present invention, reference is made to the detailed description which follows, taken in conjunction with the following illustrations.

BRIEF DESCRIPTION OF THE DRAWINGS

FIG. 1 shows a cross-sectional view of a galvanic primary cell according to the present invention.

FIG. 2 shows a sectioned, isometric view of a displacement body according to the present invention, for use with the cell shown in FIG. 1.

FIG. 3 shows comparative discharge curves.

In the views provided, like reference numerals denote similar structure.

DETAILED DESCRIPTION OF A PREFERRED EMBODIMENT

Referring to FIG. 1, the primary cell 1 is housed within an isolated plate jacket 2 which contains, in known manner, a cathode 3 comprising, e.g., pressed MnO$_2$ or Ag$_2$O moldings; a two-layer separator comprised of an external teflon fabric 4 and an internal sleeve 5 made from an ion-exchange membrane, with a cup-shaped insert 6; and an anode comprised of zinc 7 made as a paste with an alkaline electrolyte and a thickener. A sealing body 8 made of polytetrafluorethylene (PTFE) encloses the resulting assembly within the jacket 2, and receives a brass nail 9 which serves as the negative conductor.

In accordance with the present invention, a displacement body 10 is immersed into the space above the anode 7 during the mounting of the sealing body 8 and the brass nail 9. As a result of this placement, a portion of the viscous anode mass (the anode 7) is pressed to the side and upwardly, except for a residue which remains on the bottom, bringing the zinc paste against the cathode ring 3 in a layered configuration which is especially advantageous for discharge. The remaining portion 12 of the aqueous electrolyte separates and migrates into the hollow space of the displacement body 10 through a series of oblong slits 13, which are shown in FIG. 2. The openings 13 should be of such a shape, and narrowly dimensioned, so that the zinc paste is prevented from penetrating the hollow space, where it would be lost for the purposes of discharge.

The cylindrical displacement body 10 is centered at both ends by a brass disk 11 which is pushed over the end of the nail 9 and the front wall 14 of the cylindrical displacement body 10. To be noted is that this has the simultaneous effect of improving current drainage from the cell by contact with the surface of the brass disk 11 which is located in the zinc.

Thus, upon immersion of the body 10 into a metered amount of anode material the electrolyte is first displaced inside the body 10, while the pasty zinc rises up along the side of the body 10, together with the gelling agent, due to the resulting displacement action. As will be shown below, this rearrangement brings about a significant improvement of the discharge curve.

Referring to FIG. 2, the front wall 14 of the displacement body 10 preferably has additional holes 15. As a result, the walls of the displacement body 10 are provided with slit-shaped openings 13 and round openings 15 through which electrolyte liquid can flow, which permits the displaced portion 12 of the electrolyte to escape from the hollow space and to re-enter the zinc paste, e.g., in the case of great thermal expansion. The aqueous electrolyte phase is thus subjected to convective flow, which is favorable for the discharge process.

As previously indicated, the shape of the displacement body is readily varied from the preferred cylindrical shape which is shown in the drawings. The materials from which the body is manufactured, preferably by blow molding or injection molding, can also be freely varied. Alkali-resistant plastics such as polyamide, polyethylene, polypropylene, polystyrene, etc. are suitable for injection molding. Glass fiber reinforced polyvinylidene sulfide (Ryton R-4 TM) has proven to be particularly suitable for injection molding of the cylindrical body. Also useful in this regard are materials such as polytetrafluorethylene (PTFE) or polyphenylene sulfide (PPS), which have the added advantage of being both alkali-resistant and heat-resistant. Conducting plastics are also highly advantageous for use in accordance with the present invention. Instead of injection molded parts, it is also possible to use extruded tubes which are subsequently perforated. However, a drawn or punched part made of metal or plastic must be attached as the bottom in this case, to develop the function of the positioning disk 11. Mainly copper or brass, and possibly bronze, can be considered for use if the displacement body is constructed of a metal. In such cases, the displacement body is preferably manufactured of an appropriate metal fabric, an expanded metal, a perforated plate or a deep-drawn metal plate. The combination of plastic parts with metal parts is also possible. This would include the possibility of providing a plastic body with a metal coating by vapor deposition under high vacuum. In such case, the resulting coating would be in electrical contact with the current conductor, so that a large amount of zinc can be made directly available for discharge per unit time. In principle, all components of the displacement body are attached to the brass nail 9 (the negative electrode wire).

The advantageous effect of the construction according to the present invention is apparent from the discharge curves shown in FIG. 3, which show the rate of discharge of "baby"-type cells of equal size at 163° C. and under a constant current of 400 mA. Curve A represents a cell according to the present invention. Curve B represents the behavior of a cell without a displacement body, but otherwise identical in design. Curve C represents a worst-case condition, in which the anode material fills only ⅔ of the anode space, whereby the zinc is least effectively fixed, and so that major voltage drops occur from time to time.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In a galvanic primary cell with a thickened alkaline electrolyte and which contains an inner space for containing a negative electrode comprised of a pasty zinc powder, an outer positive manganese dioxide or silver oxide electrode in the form of a ring-shaped cylinder, and an interposed separator, disposed in concentric arrangement in a cup-shaped metal housing, the improvement comprising:
a hollow displacement body which is concentrically located in said inner space so that the zinc powder is radially pressed against the surface of the positive electrode.

2. The galvanic primary cell of claim 1 wherein the displacement body is cylindrical and has a flat bottom.

3. The galvanic primary cell of claim 2 wherein the flat bottom is preformed.

4. The galvanic primary cell of claim 1 wherein the displacement body is in the shape of a prism.

5. The galvanic primary cell of claim 1 wherein the wall of the displacement body includes slit-like openings.

6. The galvanic primary cell of claim 5 wherein the openings are dimensioned to prevent penetration of the zinc powder into the hollow space of the displacement body.

7. The galvanic primary cell of claim 1 wherein the wall of the displacement body includes round openings.

8. The galvanic primary cell of claim 7 wherein the openings are dimensioned to prevent penetration of the zinc powder into the hollow space of the displacement body.

9. The galvanic primary cell of claim 1 wherein the displacement body is contoured so that the zinc powder is displaced by the displacement body to form a layer which is optimized for discharge.

10. The galvanic primary cell of claim 1 wherein the displacement body is formed of an alkali-resistant plastic selected from the group consisting of polyamide, polyethylene, polypropylene, polystyrene, polytetrafluorethylene (PTFE) and polyphenylene sulfide (PPS).

11. The galvanic primary cell of claim 10 wherein the displacement body is attached to the negative electrode conductor for the cell.

12. The galvanic primary cell of claim 1 wherein the displacement body is formed of a metallic material selected from the group consisting of copper and brass in the form of a metal fabric, an expanded metal, a perforated plate or a deep-drawn metal plate.

13. The galvanic primary cell of claim 12 wherein the displacement body is attached to the negative electrode conductor for the cell.

14. The galvanic primary cell of claim 1 wherein the displacement body is formed of a plastic, a conducting plastic and a metallic material, or a plastic provided with an electrically conducting coating.

15. The galvanic primary cell of claim 14 wherein the displacement body is attached to the negative electrode conductor for the cell.

16. In a galvanic primary cell with a thickened alkaline electrolyte and which contains an inner space for containing a negative electrode comprised of a pasty zinc powder, an outer positive manganses dioxide or silver oxide electrode in the form of a ring-shaped cylinder, and an interposed separator, disposed in concentric arrangement in a cup-shaped metal housing, the improvement comprising:
   a hollow displacement body which is concentrically located in said inner space so that the zinc powder is radially pressed against the surface of the positive electrode, and which includes slit-like openings for permitting said electrolyte to move into said hollow body.

17. In a galvanic primary cell with a thickened alkaline electrolyte and which contains an inner space for containing a negative electrode comprised of a pasty zinc powder, an outer positive manganese dioxide or silver oxide electrode in the form of a ring-shaped cylinder, and an interposed separator, disposed in concentric arrangement in a cup-shaped metal housing, the improvement comprising:
   a hollow displacement body which is concentrically located in said inner space and having a wall in contact with said negative electrode so that the zinc powder of said negative electrode is radially pressed against the surface of the positive electrode by said wall.

* * * * *